Aug. 9, 1927.
F. MISCHE ET AL
1,638,501
BUFFER OR BUMPER FOR AUTOMOBILES
Filed March 26, 1927
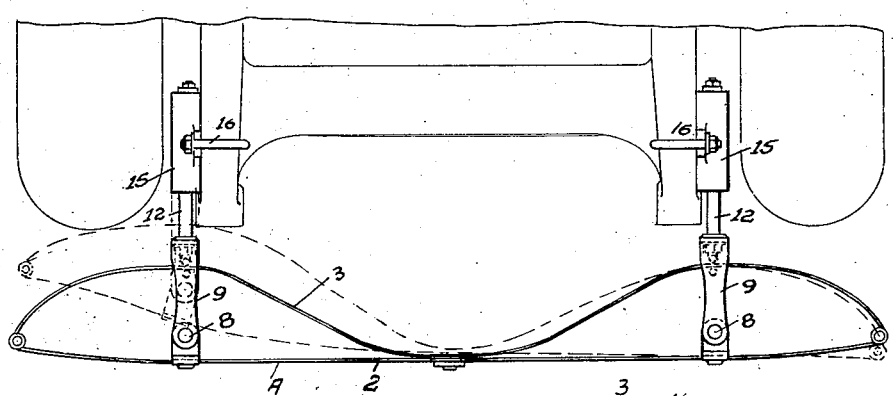
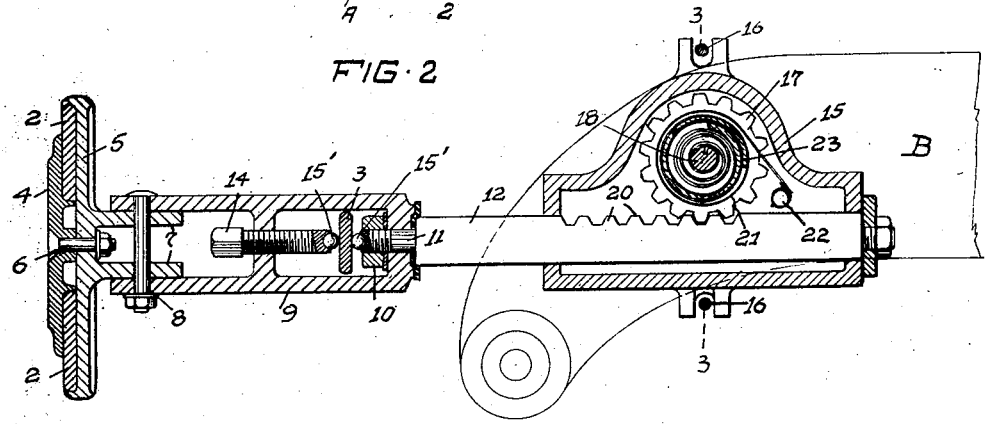
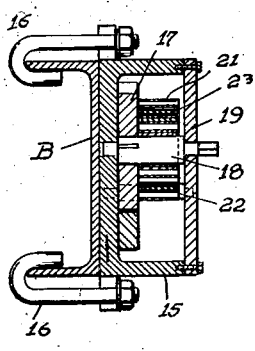
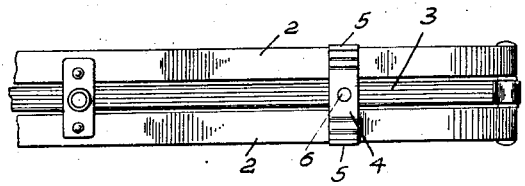
Inventor
FRANK MISCHE
KARL ROSCHITSCH
By Fisher, Moser & Moore
Attorney Patented Aug. 9, 1927.

1,638,501

UNITED STATES PATENT OFFICE.

FRANK MISCHE AND KARL ROSCHITSCH, OF CLEVELAND, OHIO.

BUFFER OR BUMPER FOR AUTOMOBILES.

Application filed March 26, 1927. Serial No. 178,550.

Our invention relates to automobile buffers or bumpers, and in general our object is to provide means for relieving and absorbing the shocks sustained by a buffer or bumper of the cross rail type such as commonly used at the front and rear ends of an automobile. Usually such bumpers are rigidly secured to an automobile frame by means of brackets, and in meeting an object the impact or blow is delivered to and absorbed by the bumper rails, which may be tubular and rigid, or made of spring steel bars to afford a given amount of resiliency. While any part of the bumper may be engaged and affected it happens that the end portions of the bumper come into contact more frequently with other bumpers or objects than the middle area, especially in parking a vehicle and in avoiding collisions with other vehicles going in the same direction. We have therefore devised a bumper and a mounting therefor which will permit the opposite ends of the bumper to yield or surrender independently in substantial degree, depending upon which end portion or half of the bumper is struck, and which will also permit the entire bumper to yield when it strikes at its middle, but such yield or surrender is always opposed by a braking effect adapted to absorb the shock in material degree. Briefly stated, each end of the bumper is supported and controlled by an independent shock-absorbing device, preferably a friction brake or snubber embodying springs, all as hereinafter shown and described and more particularly pointed out in the claims.

In the accompanying drawing, Fig. 1 is a top view of one end of an automobile, showing our improved bumper mounted thereon. Fig. 2 is a sectional view and elevation, enlarged, of the bumper and one of its shock absorbing and supporting parts. Fig. 3 is a cross section of the shock absorber on line 3—3 of Fig. 2. Fig. 4 is a front view of one half of the bumper on the same scale as shown in Fig. 1.

As shown the bumper proper is a spring bar bumper A comprising parallel front bars 2—2 and a bowed rear bar 3 affixed to the opposite ends and middle thereof. This special formation of bumper is not essential to the present invention but is merely an exemplification of one type of bar bumper which which may be used wherein a pair of front bars 2—2 may be rigidly secured between two sets of clamping members. Thus each set may comprise two clamping plates 4 and 5, respectively, fastened together by a bolt or screw 6, see Fig. 2. Rear plate 5 possesses rearwardly extending ears 7 which are pivotally connected by a vertical bolt 8 to the front end of a bifurcated part or open frame 9 which is secured by a nut 10 to the reduced front end 11 of a rack bar 12. Rear bar 3 of the bumper extends through open frame 9 and is clamped by a set screw 14 between two anti-friction balls 15′—15′ seated on opposite sides of the bar within the outer end of connecting end 11 and the inner end of set screw 14. Thus when bumper A is flexed at either end or its middle the rear bar may shift or move in respect to supporting member 9, and flexing of the front bars is permitted by pivot bolt 8 at the front end of said member 9.

Each rack bar 12 is slidably supported within its own housing or casing 15 and these casings are secured by hook bolts 16 or other means to the side members of the chassis frame B. An offset chamber in each casing 15 contains a gear 17 fixed to a short shaft 18 having rotatable bearing in the side wall of the casing and in a cover plate 19. Gear 17 is in constant mesh with the teeth 20 of rack bar 12, and the inner coil of a flat spiral spring 21 is attached to shaft 18 while the outer coil of this spring is connected to a bolt or pin 22 inside of casing 15. A brake lining or interlayer 23 of woven textile material, leather or the like is wound within one or more coils of the flat spring to produce a snubbing or braking effect on the gear during the rearward travel of the rack bar, thereby supplementing the resistance of the spring as it is being wound by the movement of the rack bar and gear. As the coils tighten the braking effect of the snubber interlayer 23 gradually increases thereby building up an increasing resistance at the bumper as it is forced rearwardly. The dual spring and snubber or brake action is therefore quite effective in protecting the car and it is also of advantage in protecting the bumper itself, especially when the ends of the bumper are pivotally connected to the rack bar or its front frame or extension as in the present instance. Thus, when the car is parked at a curb closely to another car which is being moved from its position the end of the present bumper may be engaged by another bumper or part on the other car and caused to yield without permanently bending or damaging the bumper.

In lieu of using a snubber spring such as described we may employ some other form of braking device, to resist the movement of the rack bar in one direction and work freely and responsively under spring action in the opposite or resetting direction. Other changes in other parts of the device might also be made and mechanical equivalents employed without materially affecting the invention set forth in the following claims.

What we claim, is:—

1. A buffer or bumper for automobiles, comprising means for supporting the main bumper elements, including spring controlled rack and gear mechanism adapted to yieldingly resist rearward movement of the bumper.

2. A buffer or bumper for automobiles, comprising a main bumper body, and spring controlled rack and gear mechanism pivotally connected to and adapted to support the opposite ends of said bumper body for independent rearward movement.

3. A buffer or bumper for automobiles, comprising a main impact receiving body, and a set of spring controlled rack and gear devices pivotally connected to said body and adapted to support the same for independent yielding movement at its opposite ends upon a vehicle frame.

4. A buffer or bumper for automobiles, comprising a main impact member, and a pair of spring-controlled friction-braking devices adapted to support said member yieldingly upon a vehicle body.

5. A buffer or bumper for automobiles, comprising a main impact member, means for supporting said member in a yielding position upon one end of a vehicle frame, means comprising springs adapted to press said member forwardly, and friction means connected with said springs adapted to resist forced movement of said member rearwardly toward said vehicle frame.

6. A buffer or bumper for automobiles, comprising a main bumper member, and means adapted to support said member in a horizontally movable position upon the end of a vehicle frame, including rack bars and gears and spiral springs adapted to be placed under tension by rotatable movement of said gears.

7. A buffer or bumper for automobiles, comprising a main bumper member, rack bars adapted to support said member, gears engaged with said rack bars, and coiled springs and snubbing elements cooperating therewith adapted to control the movement of said bars with braking effect.

8. A buffer or bumper for automobiles, comprising an impact member, a supporting device having pivotal connection with said impact member, a rack bar extending from said device, a casing adapted to support said bar for slidable movement, a gear within said casing engaged with said rack bar, and a coiled spring in tension connection with said gear.

9. A buffer or bumper for automobiles, comprising front and rear bars, a clamping device for the front bar, a supporting member pivotally connected to said device adapted to confine the rear bar movably therein, a set screw carried by said member opposite said rear bar, and balls on opposite sides of said rear bar held in place by said set screw.

10. A buffer or bumper for automobiles, comprising a front impact bar and a bowed rear bar, supporting members for said bars having pivotal connection with the front bar, the rear bar being free to move at each end in respect to said members, rack bars extending rearwardly from said members, supporting casings for said rack bars containing gears and spring, and means adapted to secure said casings to the side members of an automobile frame.

In testimony whereof we affix our signatures.

FRANK MISCHE.
KARL ROSCHITSCH.